United States Patent Office 2,768,496
Patented Oct. 30, 1956

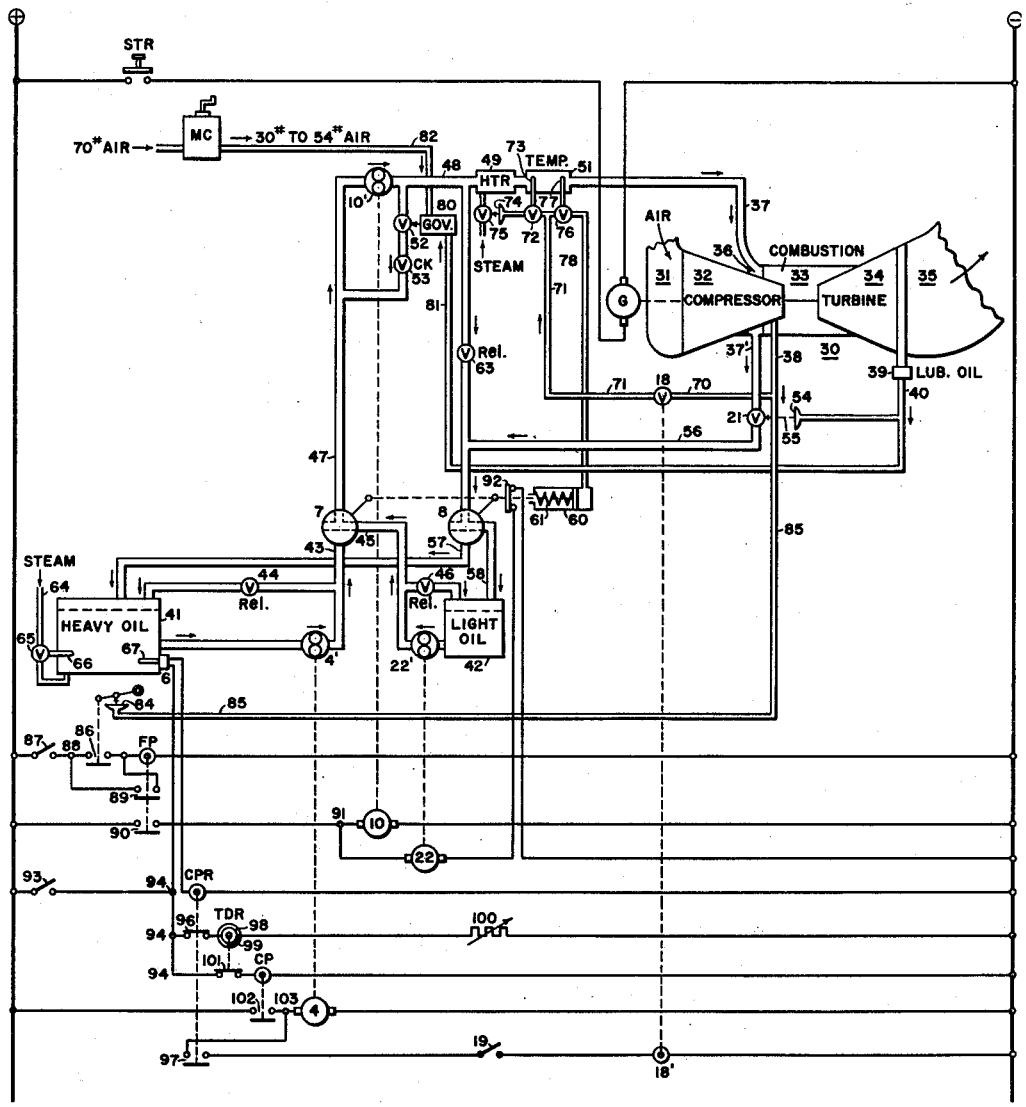

2,768,496

FUEL-TRANSFER GAS-TURBINE CONTROL

John J. Stamm, Export, and James O. Stephens, Swarthmore, Pa., assignors to Westinghouse Electric Corporation, East Pittsburgh, Pa., a corporation of Pennsylvania Application March 25, 1953, Serial No. 344,532

16 Claims. (Cl. 60—39.14)

Gas turbines, such as are used for gas-turbine locomotives, are started on diesel fuel-oil, and after a sufficient warming-up period, are switched over to heavy fuel-oil. Also, prior to shutting down, the unit must be transferred to diesel fuel, in order to flush out the fuel-piping. The diesel fuel is a relatively light fuel-oil, as compared to the heavy fuel-oil on which the turbine normally runs. The heavy fuel-oil has to be preheated, in order to give it sufficient fluidity. If it were permitted to cool inside of the fuel-intake header of the gas turbine, and inside of the fuel supply-pipes and nozzles, the heavy fuel-oil would clog, and make starting practically impossible.

The principal object of our invention is to perform the necessary fuel-transfer functions automatically, or semi-automatically, using the turbine-speed as the automatic control-function.

An exemplary form of embodiment of our invention is shown in the accompanying drawing, the single figure of which is a very much simplified diagrammatic view of circuits and apparatus, sufficient to illustrate the general principles of the invention.

In the drawing, a typical gas turbine is indicated, at 30, as comprising an air-intake chamber 31, an air-compressor 32, a combustion-chamber 33, the turbine proper 34, and an exhaust-chamber 35. The combustion-chamber 33 has a fuel-intake portion or header 36, which receives fuel-oil through a fuel-supply pipe 37, and from which fuel-oil can be dumped or drained through a drain-pipe 37'. The high-pressure end of the air-compressor 32 is tapped to supply in air-pressure pipe 38, in which there is an air-pressure which responds essentially to the speed of the turbine, as is well known. The turbine 34 drives a lubricating-oil pump 39, which has an output-pipe 40 which supplies lubricating oil at a pressure which is also dependent upon the speed of the turbine.

Two kinds of fuel-oil are provided for the turbine 30. The main fuel-oil for the turbine is a relatively inexpensive, thick, heavy fuel-oil, which is illustrated as being kept in a heavy-fuel tank 41 which is located at a lower level than the turbine, although this location is not obligatory, being illustrated because it is the location which is used in a gas-turbine locomotive using our invention. During the starting and stopping operations, however, it is necessary to operate the turbine on a diesel fuel-oil, or other light fuel-oil which remains fluid at ordinary temperatures, and which will burn satisfactorily in the combustion-chamber 33 when it is cold. This light fuel-oil is contained in a light-fuel tank 42.

In order to provide a suitable fuel-oil supply-pressure, for both the heavy-oil and the light-oil, we provide a heavy-oil pump 4', which is driven by a motor 4, to supply a heavy-oil fuel-supply pipe 43 from the heavy-oil tank 41, using a relief-valve 44 to prevent the generation of excessive fuel-pressures; and we also provide a light-oil fuel-pump 22', which is driven by a motor 22, for supplying light fuel-oil to a light-oil fuel-supply pipe 45, from the light-oil tank 42, again providing a relief-valve 46 to prevent the generation of excessive oil-pressures.

The two fuel-supply pipes 43 and 45 are used to supply fuel-oil to a three-way fuel-selector valve 7, which is operative, all at once, from one extreme position to the other, so as to effect a complete all-at-once changeover from one fuel-oil to the other, by supplying either the one or the other of the fuel-oils to a fuel-supply pipe 47, which serves as a source of supply of whichever fuel-oil is to be used by the engine or turbine 30.

The fuel-supply pipe 47 leads to a main fuel-pump 10', which is driven by a motor 10, and which supplies fuel-oil, through a pipe 48, to a heater 49, and thence to a temperature-control chamber 51, and thence to the fuel-supply pipe 37 for the gas-turbine 30. The rate of fuel-supply, which is supplied to the engine by the fuel-pump 10', is controlled by a governor-valve 52, which bypasses the fuel-pump 10', through a check-valve 53 which permits the oil to flow, in the bypassing passage, only in the bypassing direction, so that, when the main fuel-pump 10' is stopped, no material amount of fuel-oil can be supplied to the gas-turbine or engine 30. The main fuel-pump 10' thus serves as an on-or-off oil-flow means, for either delivering a material oil-flow to the engine 30, or substantially stopping the same.

The fuel-intake header 36 of the gas turbine 30 may be drained or flushed, by means of the previously mentioned drain-pipe 37', which leads to a normally closed shutdown valve 21. So far as our present invention is concerned, the shutdown valve 21 is actuated, from its normal closed position to an open position, in response to a dangerously low pressure of the lubricating oil, in the pipe 40, or, in still more general terms, in response to a reduction of the prime-mover speed, or engine-speed, to a predeterminedly low value. The actuation of the shutdown valve 21 in response to the lubricating-oil pressure is obtained through a diagrammatically indicated apparatus including a diaphragm 54, the movement of which is mechanically transmitted to the valve 21, by means of a dotted-line stem 55. In actual practice, the shutdown valve 21, in addition to being responsive to a low lubricating-oil pressure, is provided with additional operating-means (not shown), which are responsive to over-speed and to excessive exhaust-temperature, respectively, besides being manually operable.

When the shutdown valve 21 is opened, it dumps the fuel-oil from the prime-mover intake 36, through a drain-pipe 56, to a three-way dump-circuit selector-valve 8, which returns the dumped fuel-oil either to a pipe 57 which leads to the heavy-oil tank 41, or to a pipe 58 which leads to the light-oil tank 42, in the illustrated form of embodiment of our invention. It will be understood, of course, that, instead of returning the dumped fuel-oil to one of the main storage-tanks 41 or 42, it might be returned to any other or special storage-tank (not shown), or even dumped down a drain, so far as our present invention is concerned, because only a relatively small amount of fuel-oil is dumped, or needs to be dumped, and this occurs, or needs to occur, only when the engine is being shut down.

We provide a suitable fuel-selector actuator-means, which is illustrated in the form of an air-pressure cylinder 60, which is shown as operating, against a spring-pressure 61, to automatically cause a complete all-at-once actuation of both of the three-way selector-valves 7 and 8 from their initial light-oil positions (as shown), to their heavy-oil positions in which they would be connected to the heavy-oil tank 41. Essentially, however, the fuel-selector actuator 60 could be used to automatically control only the fuel-supply selector-valve 7, particularly if the oil, during the dumping-operation, were dumped into the drain, or into an auxiliary dump-oil tank (not shown).

As the automatic selector-valve mechanism is actually connected, as shown, it will actuate the dump-oil selector-valve 8 simultaneously with the feed-oil selector-valve 7. We are not limited, however, to this simultaneous valve-operation.

The main fuel-pump 10' is also protected by means of a relief-valve 63, which is connected between the delivery-pipe 48 of the pump 10', and the drain-pipe 56, so as to protect the pump 10' against excessive pressures, in case there should be any stoppage in the flow of fuel-oil to the gas turbine 30.

The heavy fuel-oil, in the tank 41, is so thick that it has to be preheated, in order that the heavy-oil circulating-pump 4' may be able to operate without overloading. To this end, it is common to provide a means for normally maintaining the heavy-oil tank 41 at a suitable temperature, such as 120° F., usually by means of a heating-source in the form of a steam pipe 64, which supplies heating-steam through a valve 65, which is under the control of a thermometer 66. The heavy-oil circulating-pump 4' is close enough to the tank 41, so that it is maintained at a temperature which is nearly as high as the heavy oil in the tank 41. This is true also of the heavy-oil relief-valve 44, which protects the heavy-oil circulating-pump 4' against excessive pressures. In order to make sure that the heavy-oil tank 41 is being maintained at the proper temperature, before the heavy-oil pump-motor 4 is energized, it has usually been customary to provide the tank 41 with a thermally responsive switch 6, which is controlled by a thermometer or other thermally responsive device 67 which is disposed inside of the tank, preferably at a point close to the intake of the heavy-oil fuel-pump 4'.

The heavy-oil tank-heating means, 64, 65, 66, just described, is needed, in order to protect the heavy-oil circulating-pump 4' against abnormal strains due to a congealed condition of the fuel-oil in the main tank 41. In addition to this heating, however, it is usually necessary or highly desirable to further heat the heavy fuel-oil before it is delivered to the combustion-chamber 33 of the gas turbine 30. This is because the combustion of the heavy fuel-oil, in the firing-nozzles (not shown) of the combustion-chamber 33, and in the combustion chamber itself, will leave gummy deposits, unless the combustion chamber itself, the firing nozzles (not shown) of the fuel-intake 36, and the actual fuel-oil which is fed into the firing nozzles, are all at suitable elevated temperatures. This is why the gas turbine has to be started on a lighter fuel-oil, such as the diesel oil which is kept in the tank 42, and why the diesel-oil operation has to be maintained for a time sufficient for the heating of the critical parts of the apparatus.

For the reasons just stated, the oil-delivery pipe 48 of the main fuel-pump or on-or-off oil-flow means 10' is heated, in the heater 49.

In accordance with our present invention, at least in its illustrated form of embodiment, we do not energize the heater 49 until some time after the prime mover has been started on the diesel fuel, and until after the prime mover has reached a suitable idling-speed which is suitable for the transfer to a heavy-fuel supply. In the illustrated form of embodiment of our invention, we obtain this response to a heavy-fuel transfer-speed, from the air-compressor air-pipe 38, which is tapped at 70, to lead, through a solenoid air-valve 18, to a pipe 71, and thence to a thermally actuated valve 72, which is controlled by a thermometer or other thermally actuated means 73 in the temperature-controlling chamber 51 of the fuel-oil pipe-line. This thermally actuated valve 72 delivers air-pressure to a diaphragm 74, which controls a steam-valve 75 for heating the heater 49, so as to automatically maintain a heavy-oil fuel-temperature of 250° F., or such other value as may be necessary or desirable.

It requires a certain amount of time for the heater 49 to be heated up, once the steam has been admitted through the valve 75, and it is desirable that this heating-time in the heater 49 shall be coordinated with the heating-time in the combustion-chamber 33 and the intake-chamber 36 of the turbine 30, so that the diesel-oil, on which the turbine is first started, will be heated to the required temperature, such as 250° F., at about the same time when the critical parts of the gas turbine 30 will become heated to a temperature suitable for receiving the heavy fuel oil.

We also provide a second thermally actuated valve 76, actuated by a second thermometer or thermally responsive device 77 in the temperature-control chamber 51, for responding to this desirable oil-temperature by connecting the air-pipe 71 to an air-pipe 78, which is connected to the selector-valve actuator-mechanism 60, so as to cause an automatic actuation of the fuel-selector valve 7, or of both the valves 7 and 8. The valve 7 is thus automatically actuated, to transfer the fuel-oil supply from the light oil to the heavy oil, and the engine thus automatically transfers itself from the light oil to the heavy oil, when it has attained a sufficient speed and when it has attained a sufficient operating-temperature to successfully operate on the heavy oil, without causing undesirable deposits in the apparatus.

The previously mentioned solenoid-operated air-valve 18 is under the control of an operating coil 18', in such manner that this valve is moved from a closed position to an open position, when this operating-coil 18' is energized. This operating-coil 18' may be continuously energized, whenever the other parts of the complete system are in proper operating condition, in which case the transfer from light to heavy fuel-oil will automatically take place, after the speed-responsive air-pressure of the compressor-output pipe 38 reaches a sufficiently high value, and as soon thereafter as the fuel-oil temperature reaches a sufficiently high value in the temperature-responsive valve 76. It is usually desirable, however, to provide some manual control, so that the engineman can disconnect the heavy-oil operation if he so desires. To this end, the energizing circuit of the valve-operating solenoid or coil 18' is provided with a fuel-control switch 19, which must be closed before a transfer is made from the light fuel to the heavy fuel.

According to the conventional showing which we use, in our drawing, the air-valve solenoid 18', as well as the other, subsequently described, solenoids or coils which operate the several relays or electrical switches, are represented as circles, which are energized from battery-terminals (+) and (—), in a schematic or across-the-line type of diagram. Inside of each coil is a smaller circle representing an armature, which is considered as being gravity biased, and as being picked up by a suitable energization of the associated coil, so as to lift the operating-stem which is actuated by that coil, and which is shown by means of a vertical dotted line. The coils are illustrated as being deenergized.

The gas engine 30 is started by means of the generator G, which it normally drives, when it is in full operation. During the starting operation, however, the generator G is reconnected as a starting-motor, as shown in the accompanying drawing, wherein, for starting purposes, the generator G is energized, as a motor, across the battery-terminals (+) and (—), through a suitable starting switch STR.

The governor-actuated fuel-valve 52 is controlled by a suitable governor 80, which is indicated by block diagram. Ordinarily, this governor is mounted on the gas turbine 30, as a part thereof, but for convenience of illustration, it is shown at a point removed therefrom, and close to the diagrammatically illustrated position of the fuel-valve 52 which it controls. This governor 80 receives a speed-responsive control, responsive to the speed of the turbine 30, through an oil-pressure pipe 81 which is connected to the lubricating-oil pipe 40, in accordance with a known type of governor-control.

The governor 80 is also under the control of a variable air-pressure which is supplied to the governor by an air-supply pipe 82, in which the air-pressure is controlled by the position of a master controller MC. This master controller MC includes or controls a variable air-pressure means, for reducing a compressed-air supply, which may be air at 70 pounds per square inch, by way of example, to pressures depending upon the position of the master controller, varying between any desirable predetermined minimum air-pressure, such as 30 pounds per square inch, in the off-position of the master controller, to any desired adjustable pressure between said minimum value and a predetermined maximum pressure, such as 54 pounds per square inch, according to the position of the master controller. These pressures are given only by way of example, the minimum air-pressure of 30 pounds per square inch keeps the engine-governor 80 energized so that the engine-speed is the desired idling speed, while the maximum master-controller pressure, such as 54 pounds per square inch, causes the engine to operate at its maximum rated speed, which is the normal speed of operation of the engine, when it is delivering its full maximum horsepower.

When the engine 30 is to be first started, or put into operation, the starting button STR is depressed, thus causing the generator G to drive the turbine from the battery-terminals (+) and (—). The engine achieves a suitable starting-speed, when, in the illustrated installation, it comes to about 2100 R. P. M. Our invention provides means for automatically responding to this starting-speed, in order to energize the main fuel-pump 10', which serves as an on-or-off oil-flow means, which either causes or prevents a significant oil-flow from the fuel-supply pipe 47 to the fuel-intake 36 of the engine or prime mover 30. When this fuel-pump 10' is energized or actuated, it causes a delivery of fuel to the engine, thus starting the engine and thereafter driving the engine from its own fuel, instead of from the starting-motor G. The means for responding to the suitable starting-speed of the engine, in the illustrated form of embodiment of our invention, is a low-pressure diaphragm 84, which is shown under the heavy-oil tank 41. This diaphragm 84 is energized in response to a low air-pressure, of say about 1½ pounds per square inch, as obtained from an air-pipe 85 which is connected to the compressor-pressure air-pipe 38, this numerical example being given only by way of illustration.

When this air-pressure builds up to an amount which indicates that the engine has attained a suitable starting-speed, the diaphragm 84 is displaced, and closes a pressure-responsive switch 86, which is used to initiate the operation of the pump-motor 10, through a fuel-pump switch or relay FP. The fuel-pump switch FP is electrically operated through a coil, which is also marked FP, which is energized from a circuit which starts at the positive battery-terminal (+) and is traceable through a start-stop switch 87, thence to a conductor 88, the air-pressure switch 86, and the fuel-pump switch-coil FP, to the negative battery terminal (—). In accordance with our invention, the fuel-pump switch FP has a make-contact 89, which is used to hold the energizing-circuit closed, by bypassing the air-pressure switch 86, so that the fuel-pump 10' will not stop when the engine stops, but will continue to operate thereafter, at least for a time long enough to flush out the heavy fuel-oil from the piping, as will be subsequently described.

The fuel-pump switch FP also has a second make-contact 90, which completes a circuit from the positive battery-terminal to a conductor 91, from which the main fuel-pump motor 10 is energized. This same conductor 91 also energizes the light-oil pump-motor 22, provided that the fuel-transfer actuator-mechanism 60 is in its initial position, in which the fuel-transfer valves 7 and 8 are connected to the light-oil tank 42. In this position, the transfer actuator-mechanism 60 closes a switch-contact 92 which is in series with the light-oil pump-motor 22. This light-oil pump-motor 22 drives the pump 22' which supplies the light oil, at a suitable supply-pressure, to the light-oil fuel-supply pipe 45 of the fuel-selector valve 7.

We also provide a manually operable fuel-transfer pump-switch 93, which energizes a circuit 94 from the positive battery-terminal (+). It is usually desirable, as previously described, to provide a safeguard to make sure that the heavy-oil tank 41 is being maintained at its desirable operating-temperature, before energizing the pump-motor 4 which drives the heavy-oil pressure-maintaining circulating-pump 4'. To this end, we provide a circulating-pump auxiliary-relay CPR, and we energize this relay from the circuit 94, through the thermally actuated switch 6 of the heavy-oil tank 41. Normally, therefore, assuming that the manual switch 93 is closed, as it usually will be, when the apparatus is maintained in a ready-to-operate condition, the circulating-pump relay CPR is energized, in which case it picks up a back-contact 96, to open the same, and it also picks up a make-contact 97, to close the same.

When the circulating-pump relay CPR is deenergized, its back-contact 96 completes an energizing-circuit from the conductor 94 to the operating coil 98 of a time-delay relay TDR. This relay is provided with suitable time-delay means, such as a lag-ring 99, and its operating-coil 98 is energized through a circuit containing a variable resistance 100, so that, when the time-delay relay TDR is first energized, it will respond slowly, in a time which can be adjusted by means of the variable resistance 100. The time-delay relay has a back-contact 101, so that, when this relay is not energized, its back-contact 101 completes a circuit from the conductor 94 to the coil of a circulating-pump main-relay CP. This relay CP has a make-contact 102, which energizes a circuit 103 from the positive battery-terminal, whenever this circulating-pump main-relay CP is energized. The circuit 103 is used to energize the heavy-oil circulating-pump motor 4, to drive the heavy-oil pressure-maintaining pump 4'. The said circuit 103 is also used to energize the solenoid 18' of the solenoid air-valve 18, this energizing-circuit also including the make-contact 97 of the circulating-pump auxiliary-relay CPR, and the manual fuel-control switch 19.

To briefly review the operation, it will be noted that when the apparatus is to be put into a condition in readiness for operation, the start-stop switch 87 and the fuel-transfer switch 93 will both be closed. The fuel-transfer switch 93 must be closed, because, when opened, this switch prevents the continuous operation of the pump-motor 4, which is not necessary when the apparatus is not to be kept in readiness for service.

When the engineman wishes to start the engine 30, he depresses the start-button STR, and when the engine achieves a suitable starting-speed, such as 2100 R. P. M., the low-pressure diaphragm 84 closes the air-pressure switch 86 and actuates, and seals in, the fuel-pump relay FP, which starts both of the pump-motors 10 and 22 which are necessary to supply light fuel-oil to the engine 30, the fuel-transfer switch 7 being then in its light-oil condition, as illustrated. The engine thereupon starts on the light fuel-oil from the tank 42.

If, now, the manual fuel-control switch 19 is open, there will be no fuel-transfer to the heavy fuel-oil, until the engineman closes said switch 19. Even when this switch 19 is closed, however (and it can very well be left closed at all times, in readiness for complete automatic operation in accordance with our invention), the fuel-transfer from light oil to heavy oil will not be made until two things happen.

The first condition, precedent to a fuel-transfer operation from light to heavy fuel-oil, is the attainment of a suitable idling speed, such as 6000 R. P. M., at which time the air-compressor 32 of the prime mover 30 will deliver a suitable air-pressure of, say, 24 pounds per square inch, by way of example, which is the pressure necessary to actuate the fuel-transfer actuating-mechanism 60, against the back-pressure of its spring 61. As soon as some suitable air-pressure is supplied to the thermally actuated valve 72, and through it to the diaphragm 74, the steam-valve 75 will be opened, thus starting the heating-operation of the heater 49, at an air-pressure which may, or may not, be as high as the air-pressure which is necessary to actuate the transfer-actuator 60.

The second condition, precedent to the actuation of the fuel-transfer actuator 60 from light to heavy fuel-oil, is an opening of the thermally operated valve 76 in response to the attainment of a suitable temperature of the heater 49, through which the fuel-oil is supplied to the engine or prime mover 30. It is desirable, as previously stated, to design this heater 49 so that it will not attain its suitable temperature before the combustion-chamber 33 and the intake fuel-chamber 36 of the engine achieve their proper operating-temperatures, in readiness for the proper combustion of the heavy fuel-oil.

When these two conditions-precedent are achieved, namely adequate engine-speed, and adequate engine-temperature or fuel-oil temperature, assuming that the manual fuel-control switch 19 is already closed, or is now closed, the fuel-transfer mechanism 60 will actuate the three-way valves 7 and 8 from their light-oil positions to their heavy-oil positions, in which the fuel-supply pipe 47 will be connected to the heavy-oil pipe 43, and the dump-pipe 56 will be connected to the discharge-pipe 57 into the heavy-oil tank 41. The engine will now be operating, at its idling speed, using heavy fuel-oil to maintain its operation, and the light-oil pump-motor 22 will have become deenergized, in response to the actuation of the actuator-mechanism 60 of the fuel-transfer switches. If, now, the master controller MC is actuated from its off-position to any adjusted on-position, the speed of the prime mover 30 will be correspondingly regulated, through the master-controller variable-air-pressure pipe 82 and the governor 80.

Previous to the commencement of the above-described starting-operation, the shutdown valve 21 was open, for lack of any lubricating-oil pressure on the diaphragm 54. As soon as the starting-operation was commenced, however, the lubricating oil-pressure built up, and this shutdown valve 21 was automatically closed in response to this pressure.

If, at any time thereafter, the engine should stop, or be shut down, either because it was stalled, or because of any manual or automatic control-mechanism, the engine will not stop instantly, but its speed will gradually reduce towards zero, and before the engine-speed can reach zero, the lubricating oil-pressure, which serves as a speed-responsive means, will cause an actuation of the shutdown valve 21 to its open position, in which case it dumps the fuel oil directly from the intake-chamber 36 of the engine, so that substantially no fuel-oil will get into the engine, to be consumed therein, but this fuel-oil, whether it be heavy oil or light oil, will be circulated around, being supplied through the pipe 47 and being returned through the drain-pipe 56, without getting into the engine in any material quantities.

At some time during the deceleration of the engine, usually at a speed which is some 10 or 15% below the speed at which the fuel-transfer mechanism 60 was first actuated, this fuel-transfer mechanism 60 will become deactuated, so that its spring 61 will completely return it, all at once, to its initial light-fuel position, resulting in completely changing over from heavy to light oil, in response to a reduction of the prime-mover speed to a predeterminedly low value. Thus, the fuel-transfer valves 7 and 8 will be returned to their illustrated light-fuel positions. At the same time, when the fuel-transfer mechanism 60 returns to its light-fuel position, it closes its switch 92 and reenergizes the light-oil pump-motor 22. Hence, the light-oil pressure-maintaining pump 22 and the main pump 10 will continue operating, supplying light fuel-oil to the engine-intake 36, and circulating that light fuel-oil immediately back again, into the light-oil tank 42, through the shutdown valve 21 and the dump-pipes 56 and 58.

In this manner, we automatically flush out the heavy fuel from the fuel-piping, leaving the apparatus in condition for a resumption of operation, thus avoiding the extremely troublesome condition of having the fuel-piping clogged with congealed heavy fuel-oil, which sometimes requires a major service-operation to clear it out. According to our invention, the two oil-circulating pumps 10' and 22' continue to operate for some time after the stopping of the engine, and at least long enough to flush out the fuel-piping as just described. In the apparatus as illustrated in the accompanying drawing, this operation of circulating light fuel-oil, with the shutdown valve 21 open, will continue until another starting-operation is needed, or until the entire equipment is shut down by the opening of the start-stop switch 87.

The time-delay relay TDR is used, in order to prevent a stoppage of the gas turbine 30, in the event that the heavy-oil tank 41 should drop to a temperature below its safe operating-temperature, or in the event that the engine-man should wish to discontinue operation on the heavy fuel-oil, and to continue the engine-operation on the more expensive diesel or light fuel-oil. Thus, if the circuit of the auxiliary circulating-pump relay CPR should be opened, either at the thermally responsive switch 6 or at the hand-switch 93, the CPR back-contact 96 will close, and will energize the time-delay relay TDR, and at the same time the CPR make-contact 97 will open, and will deenergize the solenoid air-valve 18, which in turn deenergizes the air-actuated mechanism 60, causing the latter to return to its light-fuel position. The time-delay relay TDR does not pick up its back contact 101 immediately, however, but interposes a suitable time-delay, during which the aforesaid back-contact 101 continues to energize the main circulating-pump relay CP, which in turn continues the energization of the heavy-oil pump-motor 4, so that the heavy-oil pressure-maintaining pump 4' will continue to deliver heavy oil to the engine 30 until the transfer to the light oil can be effected, thus avoiding breaking the suction of the main fuel-pump 10'. This is necessary because, if the engine ceases firing for even a moment, it will lose its firing capacity, and will commence to stop, and it will not automatically refire, even though the flow of fuel-oil is immediately resumed.

While we have illustrated our invention in a single illustrative form of embodiment, we wish it to be understood that we are not limited to this particular apparatus, as we are entitled to the use of equivalent devices for performing the various control-functions which we have described, and of course, in any actual installation, a much more complicated equipment will be used, including fuses and many other safeguards and auxiliaries, as will be readily understood by those skilled in the art.

We claim as our invention:

1. A power-plant including:

(a) a fuel-consuming prime mover of a type which normally operates on a heavy fuel-oil, but which has to be started on a lighter fuel-oil, and has to be changed over to said lighter fuel-oil before said prime mover completely stops; said prime mover having a fuel intake means;

(b) a fuel-selector valve-means which is operative, when actuated, to effect a complete all-at-once change-over from one fuel-oil to the other; said fuel-selector valve-means being connected to the prime-mover fuel-intake and including means for supplying both heavy fuel and light fuel; and (c) a speed-responsive means, responsive to the speed of the prime mover, said speed-responsive means including a means which causes a complete all-at-once actuation of said fuel-selector valve-means (b) in such direction as to completely change over from heavy to light oil in response to a reduction of the prime-mover speed to a predeterminedly low value.

2. The invention as defined in claim 1, in combination with:

(d) a shutdown valve-means, actuatable to return fuel-oil from the prime-mover fuel-intake to a fuel-oil storage-tank; and (e) a means for automatically maintaining a fuel-supply to said prime-mover fuel-intake for a period which is at least long enough to flush out a large portion of any heavy fuel-oil which may have been in the fuel-flow system, upon a shutting down of the prime mover.

3. A power-plant including:

(a) a fuel-consuming prime mover of a type which normally operates on a heavy fuel-oil, but which has to be started on a lighter fuel-oil, and has to be changed over to said lighter fuel-oil before said prime mover completely stops; said prime mover having a fuel-intake means;

(b) a fuel-selector valve-means, for changing over from one fuel-oil to the other; said fuel-selector valve-means being connected to the prime-mover fuel-intake and including means for supplying both heavy fuel and light fuel;

(c) a speed-responsive means, operative to a non-actuated condition in response to a reduction of the prime-mover speed to a predeterminedly low value;

(d) a means for heating the prime-mover fuel-input to a predetermined temperature;

(e) a thermally responsive means, operative to an actuated condition in response to the attainment of a predetermined temperature by some portion of the prime mover, and operative to a non-actuated condition in response to a reduction of the temperature of said portion to a predeterminedly low value;

(f) a means tending to actuate said fuel-selector valve-means (b) from light to heavy oil, in response to an actuated condition of said thermally responsive means (e); and (g) a means for causing an actuation of said fuel-selector valve-means (b) from heavy to light oil, in response to a non-actuated condition of said speed-responsive means (c), and also in response to a non-actuated condition of said thermally responsive means (e).

4. The invention as defined in claim 3, characterized by said thermally responsive means (e) being responsive to the temperature of the fuel-input of the prime mover.

5. The invention as defined in claim 3, in combination with:

(h) a shutdown valve-means, actuatable to return fuel-oil from the prime-mover fuel-intake to a fuel-oil storage-tank; and (i) a means for automatically maintaining a fuel-supply to said prime mover fuel-intake for a period which is at least long enough to flush out a large portion of any heavy fuel-oil which may have been in the fuel-flow system, upon a shutting down of the prime mover.

6. A power-plant including:

(a) a fuel-consuming prime mover of a type which normally operates on a heavy fuel-oil, but which has to be started on a lighter fuel-oil, and has to be changed over to said light fuel-oil before said prime mover completely stops; said prime mover having a fuel-intake means;

(b) a fuel-supply pipe for supplying whichever fuel-oil is to be used; said fuel-supply pipe being connected to the prime-mover fuel-intake and including means for supplying both heavy fuel and light fuel;

(c) a light-oil fuel-supply means;

(d) a heavy-oil fuel-supply means;

(e) a fuel-selector valve-means, for connecting said fuel-supply pipe (b) to one or the other of said two fuel-supply means (c) and (d), said fuel-selector valve-means being initially in a condition in which it connects the fuel-supply pipe (b) to the light-oil fuel-supply means (c);

(f) an on-or-off oil-flow means, for either causing or preventing a significant fuel-flow from said fuel-supply pipe (b) to the fuel-intake of the prime mover (a), said on-or-off means being initially in an off-condition in which it prevents any significant fuel-flow from said fuel-supply pipe (b) to the fuel-intake of the prime mover (a);

(g) An auxiliary starting-means for initially rotating the prime mover (a) to start the same;

(h) a starting-speed-responsive means, responsive to a condition accompanying the attainment of a sufficient starting-speed of the prime mover (a), to actuate said on-or-off means (f) to an on-condition in which it causes a significant fuel-flow from said fuel-supply pipe (b) to the fuel-intake of the prime mover (a);

(i) an on-condition holding-means, for thereafter automatically holding said on-or-off means (f) in said on-condition, at least until a time which is long enough to flush out a large portion of any heavy fuel-oil which may have been in the fuel-flow system, upon a shutting down of the prime mover (a);

(j) a means whereby said fuel-selector valve-means (e) may be actuated to a condition in which it connects the fuel-supply pipe (b) to the heavy-oil fuel-supply means (d);

(k) a shutdown valve means, actuatable to return fuel-oil from the prime-mover fuel-intake to a fuel-oil storage-tank; and (l) a shutdown speed-responsive means, responsive to a reduction of the prime-mover speed to a predeterminedly low value, including a means which causes an actuation of said fuel-selector valve-means (e) to a condition in which it connects the fuel-supply pipe (b) to the light-oil fuel-supply means (c).

7. A power-plant including:

(a) a fuel-consuming prime mover of a type which normally operates on a heavy fuel-oil, but which has to be started on a lighter fuel-oil, and has to be changed over to said lighter fuel-oil before said prime mover completely stops; said prime mover having a fuel-intake means;

(b) a fuel-supply pipe for supplying whichever fuel-oil is to be used; said fuel-supply pipe being connected to the prime-mover fuel-intake and including means for supplying both heavy fuel and light fuel;

(c) a light-oil fuel-supply means;

(d) a heavy-oil fuel-supply means;

(e) a fuel-selector valve-means, for connecting said fuel-supply pipe (b) to one or the other of said two fuel-supply means (c) and (d), said fuel-selector valve-means being initially in a condition in which it connects the fuel-supply pipe (b) to the light-oil fuel-supply means (c);

(f) an on-or-off oil-flow means, for either causing or preventing a significant fuel-flow from said fuel-supply pipe (b) to the fuel-intake of the prime mover (a), said on-or-off means being initially in an off-condition in which it prevents any significant fuel-flow from said fuel-supply pipe (b) to the fuel-intake of the prime mover (a);

(g) an auxiliary starting-means for initially rotating the prime mover (a) to start the same;

(h) a starting-speed-responsive means, responsive to a condition accompanying the attainment of a sufficient starting-speed of the prime mover (a), to actuate said on-or-off means (f) to an on-condition in which it causes a significant fuel-flow from said fuel-supply pipe (b) to the fuel-intake of the prime mover (a);

(i) an on-condition holding-means, for thereafter automatically holding said on-or-off means (f) in said on-condition, at least until a time which is long enough to flush out a large portion of any heavy fuel-oil which may have been in the fuel-flow system, upon a shutting down of the prime mover (a);

(j) a preheating-means, actuatable to heat the fuel-flow from said fuel-supply pipe (b) to the fuel-intake of the prime mover (a), to a predetermined temperature;

(k) a heavy-fuel control-means, actuatable to establish a condition precedent to an actuation of the fuel-selector valve-means (e) to a condition in which it connects the fuel-supply pipe (b) to the heavy-oil fuel-supply means (d), and also to initiate the heating operation of said preheating-means (j);

(l) a thermally responsive means, operative to an actuated condition in response to the attainment of a predetermined temperature by some portion of the prime mover, and operative to a non-actuated condition in response to a reduction of the temperature of said portion to a predeterminedly low value, the actuated condition of said thermally responsive means including a means for establishing a second condition precedent to an actuation of the fuel-selector valve-means (e) to its condition in which it connects the fuel-supply pipe (b) to the heavy-oil fuel-supply means (d), and the non-actuated condition of said thermally responsive means including a means for causing an actuation of the fuel-selector valve-means (e) to its condition in which it connects the fuel-supply pipe (b) to the light-oil fuel-supply means (c);

(m) a shutdown valve-means, actuatable to return fuel-oil from the prime-mover fuel-intake to a fuel-oil storage-tank; and (n) a shutdown speed-responsive means, responsive to a reduction of the prime-mover speed to a predeterminedly low value, including a means which causes an actuation of said fuel-selector valve-means (e) to a condition in which it connects the fuel-supply pipe (b) to the light-oil fuel-supply means (c).

8. The invention as defined in claim 7, characterized by said thermally responsive means (l) being responsive to the temperature of the fuel-input of the prime mover.

9. A power-plant including:

(a) a fuel-consuming prime mover of a type which normally operates on a heavy fuel-oil, but which has to be started on a lighter fuel-oil, and has to be changed over to said lighter fuel-oil before said prime mover completely stops; said prime mover having a fuel-intake means;

(b) a fuel-selector valve-means which is operative, when actuated, to effect a complete all-at-once change-over from one fuel-oil to the other; said fuel-selector valve-means being connected to the prime-mover fuel-intake and including means for supplying both heavy fuel and light fuel; and (c) a speed-responsive means, responsive to the speed of the prime mover, said speed-responsive means including a means which tends to actuate said fuel-selector valve-means (b) from light to heavy oil in response to the attainment of a predetermined speed by the prime mover, and said speed-responsive means including a means which causes a complete all-at-once actuation of said fuel-selector valve-means (b) in such direction as to completely change over from heavy to light oil in response to a reduction of the prime-mover speed to a predeterminedly low value.

10. The invention as defined in claim 9, in combination with:

(d) a shutdown valve-means, actuatable to return fuel-oil from the prime-mover fuel-intake to a fuel-oil storage-tank; and (e) a means for automatically maintaining a fuel-supply to said prime-mover fuel-intake for a period which is at least long enough to flush out a large portion of any heavy fuel-oil which may have been in the fuel-flow system, upon a shutting down of the prime mover.

11. A power-plant including:

(a) a fuel-consuming prime mover of a type which normally operates on a heavy fuel-oil, but which has to be started on a lighter fuel-oil, and has to be changed over to said lighter fuel-oil before said prime mover completely stops; said prime mover having a fuel-intake means;

(b) a fuel-selector valve-means, for changing over from one fuel-oil to the other; said fuel-selector valve-means being connected to the prime-mover fuel-intake and including means for supplying both heavy fuel and light fuel;

(c) a speed-responsive means, operative to an actuated condition in response to the attainment of a predetermined speed by the prime mover, and operative to a non-actuated condition in response to a reduction of the prime-mover speed to a predeterminedly low value;

(d) a means for heating the prime-mover fuel-input to a predetermined temperature;

(e) a thermally responsive means, operative to an actuated condition in response to the attainment of a predetermined temperature by some portion of the prime mover, and operative to a non-actuated condition in response to a reduction of the temperature of said portion to a predeterminedly low value;

(f) a means tending to actuate said fuel-selector valve-means (b) from light to heavy oil, in response to an actuated condition of both said speed-responsive means (c) and said thermally responsive means (e); and (g) a means for causing an actuation of said fuel-selector valve-means (b) from heavy to light oil, in response to a non-actuated condition of said speed-responsive means (c), and also in response to a non-actuated condition of said thermally responsive means (e).

12. The invention as defined in claim 11, characterized by said thermally responsive means (e) being responsive to the temperature of the fuel-input of the prime mover.

13. The invention as defined in claim 11, in combination with:

(h) a shutdown valve-means, actuatable to return fuel-oil from the prime-mover fuel-intake to a fuel-oil storage-tank; and (i) a means for automatically maintaining a fuel-supply to said prime mover fuel-intake for a period which is at least long enough to flush out a large portion of any heavy fuel-oil which may have been in the fuel-flow system, upon a shutting down of the prime mover.

14. A power-plant including:

(a) a fuel-consuming prime mover of a type which normally operates on a heavy fuel-oil, but which has to be started on a lighter fuel-oil, and has to be changed over to said lighter fuel-oil before said prime mover completely stops; said prime mover having a fuel-intake means;

(b) a fuel-supply pipe for supplying whichever fuel-oil is to be used; said fuel-supply pipe being connected to the prime-mover fuel-intake and including means for supplying both heavy fuel and light fuel;

(c) a light-oil fuel-supply means;

(d) a heavy-oil fuel-supply means;

(e) a fuel-selector valve-means, for connecting said fuel-supply pipe (b) to one or the other of said two fuel-supply means (c) and (d), said fuel-selector valve-means being initially in a condition in which it connects the fuel-supply pipe (b) to the light-oil fuel-supply means (c);

(f) an on-or-off oil-flow means, for either causing or preventing a significant fuel-flow from said fuel-supply pipe (b) to the fuel-intake of the prime mover (a), said on-or-off means being initially in an off-condition in which it prevents any significant fuel-flow from said fuel-supply pipe (b) to the fuel-intake of the prime mover (a);

(g) an auxiliary starting-means for initially rotating the prime mover (a) to start the same;

(h) a starting-speed-responsive means, responsive to a condition accompanying the attainment of a sufficient starting-speed of the prime mover (a), to actuate said on-or-off means (f) to an on-condition in which it causes a significant fuel-flow from said fuel-supply pipe (b) to the fuel-intake of the prime mover (a);

(i) an on-condition holding-means, for thereafter automatically holding said on-or-off means (f) in said on-condition, at least until a time which is long enough to flush out a large portion of any heavy fuel-oil which may have been in the fuel-flow system, upon a shutting down of the prime mover (a);

(j) a heavy-fuel speed-responsive means, responsive to the attainment of a prime-mover heavy-fuel transfer-speed which is higher than the starting-speed of item (h), including a means which tends to actuate said fuel-selector valve-means (e) to a condition in which it connects the fuel-supply pipe (b) to the heavy-oil fuel-supply means (d);

(k) a shutdown valve-means, actuatable to return fuel-oil from the prime-mover fuel-intake to a fuel-oil storage-tank; and (l) a shutdown speed-responsive means, responsive to a reduction of the prime-mover speed to a predeterminedly low value, including a means wthich causes an actuation of said fuel-selector valve-means (e) to a condition in which it connects the fuel-supply pipe (b) to the light-oil fuel-supply means (c).

15. A power-plant including:

(a) a fuel-consuming prime mover of a type which normally operates on a heavy fuel-oil, but which has to be started on a lighter fuel-oil, and has to be changed over to said lighter fuel-oil before said prime mover completely stops; said prime mover having a fuel-intake means;

(b) a fuel-supply pipe for supplying whichever fuel-oil is to be used; said fuel-supply pipe being connected to the prime-mover fuel-intake and including means for supplying both heavy fuel and light fuel;

(c) a light-oil fuel-supply means;

(d) a heavy-oil fuel-supply means;

(e) a fuel-selector valve-means, for connecting said fuel-supply pipe (b) to one or the other of said two fuel-supply means (c) and (d), said fuel-selector valve-means being initially in a condition in which it connects the fuel-supply pipe (b) to the light-oil fuel-supply means (c);

(f) an on-or-off oil-flow means, for either causing or preventing a significant fuel-flow from said fuel-supply pipe (b) to the fuel-intake of the prime mover (a), said on-or-off means being initially in an off-condition in which it prevents any significant fuel-flow from said fuel-supply pipe (b) to the fuel-intake of the prime mover (a);

(g) an auxiliary starting-means for initially rotating the prime mover (a) to start the same;

(h) a starting-speed-responsive means, responsive to a condition accompanying the attainment of a sufficient starting-speed of the prime mover (a), to actuate said on-or-off means (f) to an on-condition in which it causes a significant fuel-flow from said fuel-supply pipe (b) to the fuel-intake of the prime mover (a);

(i) an on-condition holding-means, for thereafter automatically holding said on-or-off means (f) in said on-condition, at least until a time which is long enough to flush out a large portion of any heavy fuel-oil which may have been in the fuel-flow system, upon a shutting down of the prime mover (a);

(j) a preheating-means, actuatable to heat the fuel-flow from said fuel-supply pipe (b) to the fuel-intake of the prime mover (a), to a predetermined temperature;

(k) a heavy-fuel speed-responsive means, responsive to the attainment of a prime-mover heavy-fuel transfer-speed which is higher than the starting-speed of item (h), which tends to cause the heating operation of the pre-heating-means (j);

(l) a thermally responsive means, operative to an actuated condition in response to the attainment of a predetermined temperature by some portion of the prime mover, and operative to a non-actuated condition in response to a reduction of the temperature of said portion to a predeterminedly low value, the actuated condition of said thermally responsive means including a means which tends to cause an actuation of the fuel-selector valve-means (e) to its condition in which it connects the fuel-supply pipe (b) to the heavy-oil fuel-supply means (d), and the non-actuated condition of said thermally responsive means including a means for causing an actuation of the fuel-selector valve-means (e) to its condition in which it connects the fuel-supply pipe (b) to the light-oil fuel-supply means (c);

(m) a shutdown valve-means, actuatable to return fuel-oil from the prime-mover fuel-intake to a fuel-oil storage-tank; and (n) a shutdown speed-responsive means, responsive to a reduction of the prime-mover speed to a predeterminedly low value, including a means which causes an actuation of said fuel-selector valve-means (e) to a condition in which it connects the fuel-supply pipe (b) to the light-oil fuel-supply means (c), and a means which causes a deenergization of the preheating-means (j).

16. The invention as defined in claim 15, characterized by said thermally responsive means (l) being responsive to the temperature of the fuel-input of the prime mover.

References Cited in the file of this patent

UNITED STATES PATENTS

| | | |
|---|---|---|
| 1,250,461 | Howe | Dec. 18, 1917 |
| 1,334,491 | Henner | Mar. 23, 1920 |
| 1,467,620 | Lindsey | Sept. 11, 1923 |
| 2,223,953 | Davis | Dec. 3, 1940 |
| 2,243,594 | Devoe et al. | May 27, 1941 |
| 2,595,759 | Buckland et al. | May 6, 1952 |